United States Patent [19]
Yokoyama et al.

[11] Patent Number: 4,780,300
[45] Date of Patent: Oct. 25, 1988

[54] PROCESS FOR REFORMING METHANOL

[75] Inventors: Naruo Yokoyama; Tetsuya Imai; Hiroshi Fujita; Mitsuharu Murakami, all of Hiroshima; Yoshio Miyairi, Tokyo; Mamoru Tamai, Hiroshima, all of Japan

[73] Assignee: Mitsubishi Jukogyo Kabushiki Kaisha, Japan

[21] Appl. No.: 11,371

[22] Filed: Feb. 4, 1987

Related U.S. Application Data

[63] Continuation of Ser. No. 771,993, Sep. 3, 1985, abandoned.

[30] Foreign Application Priority Data

Sep. 4, 1984 [JP] Japan ............................ 59-183632
Apr. 5, 1985 [JP] Japan ............................ 60-71093

[51] Int. Cl.$^4$ .............................................. C01B 1/13
[52] U.S. Cl. ............................ 423/415 A; 423/648.1; 502/315; 502/318; 502/345
[58] Field of Search .......... 423/652, 653, 654, 415 A, 423/648 R; 502/306, 314, 315, 318, 324, 328, 331, 337, 345

[56] References Cited

U.S. PATENT DOCUMENTS

| | | | |
|---|---|---|---|
| 3,393,979 | 7/1968 | Holmes et al. | 423/654 X |
| 3,515,514 | 6/1970 | Holmes et al. | 423/654 |
| 3,518,055 | 6/1970 | Egashira et al. | 423/654 X |
| 3,737,291 | 6/1973 | Lhonore et al. | 48/214 |
| 4,089,941 | 5/1978 | Villemin | 423/654 |
| 4,091,086 | 5/1978 | Hindin et al. | 423/648 R |
| 4,101,449 | 7/1978 | Noda et al. | 423/654 X |
| 4,110,256 | 8/1978 | Takeuchi et al. | 423/654 |
| 4,175,115 | 11/1979 | Ball et al. | 423/415 A |
| 4,407,238 | 10/1983 | Yoon | 423/648 R |
| 4,499,205 | 2/1985 | Masuda | 502/303 |
| 4,552,861 | 11/1985 | Courty et al. | 502/302 |
| 4,631,266 | 12/1986 | Wold et al. | 502/324 |
| 4,632,774 | 12/1986 | Fox et al. | 502/177 |
| 4,676,972 | 6/1987 | Velenyi et al. | 423/648 R |

FOREIGN PATENT DOCUMENTS

| | | | |
|---|---|---|---|
| 0184704 | 10/1984 | Japan | 423/653 |
| 0184701 | 10/1984 | Japan | 423/653 |

Primary Examiner—Olik Chaudhuri
Attorney, Agent, or Firm—Toren, McGeady & Associates

[57] ABSTRACT

A process for methanol which comprises cracking 100 moles of methanol in admixture with 1 to 99 moles of water, thereby obtaining a gas containing hydrogen and carbon monoxide, is described. The process is preferably carried out using a catalyst which consists of a carrier comprising copper and chromium oxides with or without manganese oxide and/or barium oxide and a catalytic component of nickel oxide or a mixture of nickel oxide and a basic oxide.

7 Claims, No Drawings

PROCESS FOR REFORMING METHANOL

This is a continuation of application Ser. No. 771,993, filed Sept. 3, 1985, now abandoned.

BACKGROUND OF THE INVENTION

1. Field of the Invention

This invention relates to a process for reforming methanol and more particularly, to a process for cracking methanol in admixture with water by the use of a catalyst comprising at least one metal selected from copper, zinc, chromium and metals of Group VIII and oxides thereof, whereby methanol can be stably cracked over a long period of time to obtain a gaseous mixture containing hydrogen and carbon monoxide.

2. Description of Prior Art

At present, crude oil and petroleums refined from the oil have been used as liquid fuels for use in boilers of power stations and internal combustion engines, gas fuels and starting materials for producing reductive gases. Because of the recent rise in oil prices, methanol prepared from fossil fuels other than crude oil has attracted attention for use as the starting materials.

Methanol is advantageous since it is cracked into a hydrogen-containing gas at temperatures much lower than naphtha so that, waste heat can be utilized as the heat source for the cracking reaction.

For the cracking of methanol, there have been proposed several types of catalysts including catalysts which comprise at least one metal selected from copper, zinc, chromium and metals of Group VIII, and oxides thereof, e.g. catalysts in which platinum group elements such as platinum, or base metals such as copper, nickel, chromium and zinc or oxides thereof are supported on a carrier such as alumina, and catalysts for methanol synthesis which comprise zinc, chromium or copper. The present inventors have already proposed catalysts which have higher low temperature activity than the above known catalysts and suffer little side reactions and which consist of at least one member selected from oxides of copper, zinc and chromium, and nickel oxide supported on or mixed with the at least one member (Japanese Laid-open Patent Application Nos. 57-174138 and 57-174139). Also, we proposed a catalyst in which platinum or palladium is supported on a carrier of alumina covered with basic oxides (Japanese Laid-open Patent Application No. 57-68140).

However, the above catalysts have the problem that when methanol alone is used as the starting material, the catalysts do not have satisfactory low temperature activity and carbon deposits thereon with the result that the life of the catalyst is shortened.

SUMMARY OF THE INVENTION

It is accordingly an object of the invention to provide processes for reforming methanol which overcomes the prior art problems and which ensures higher catalytic activity and high durability over a longer time.

We have made intensive studies to overcome the prior art problems and, as a result, found that when methanol is thermally cracked in admixture with 1 to 99 moles of water per 100 moles of methanol, the low temperature activity increases and the life of catalyst is extended because carbon does not deposit.

The cracking method according to the invention is thus characterized by thermally cracking of a mixture containing 100 moles of methanol in 1 to 99 moles of water.

In a preferred embodiment of the invention, the cracking reaction is conducted in the presence of a catalyst containing at least one members selected from the group consisting of copper, zinc, chromium and metals of Group VIII of the Periodic Table and oxides thereof, thereby obtaining a hydrogen-containing gas.

It should be noted that if methanol is cracked in the presence of water in the above-defined mixing ratio, any known catalysts for methanol cracking may be used with improved results with regard to low temperature activity and life.

DETAILED DESCRIPTION OF THE INVENTION

The cracking reaction where 100 moles of methanol are used in combination with 1 to 99 moles of water proceeds according to the following formula (1)

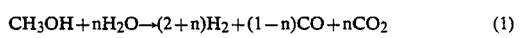

$$CH_3OH + nH_2O \rightarrow (2+n)H_2 + (1-n)CO + nCO_2 \quad (1)$$

in which $0 < n < 1$.

The gas produced according to reaction (1) is advantageous in that the produced gas increases in exotherm corresponding to the endotherm of the cracking reaction. In addition, when the produced gas having a high octane number is utilized in internal combustion engines designed to produce high output power, the compression ratio may be increased and this permits improved thermal efficiency. The produced gas has another advantage in that clean combustion is possible without discharge of aldehydes such as formaldehyde as usually takes place in the combustion of methanol. This makes it possible to utilize the gas as a fuel for automobiles as a pollution-free fuel for power station.

If hydrogen is separated from the gas produced according to the reaction (1), it may be used as a fuel for electric generation of fuel cell, or as a hydrogen source for use in the hydrogenation reaction of various organic compounds in the fields of petroleum refining and chemical industries. Alternatively, carbon monoxide may be separated from the produced gas and used as one of sources for carbon monoxide.

The reason why the amount of coexisting water is defined within a certain range in the practice of the invention is that when the amount of water is less than 1 mole per 100 moles of methanol, the effect of the addition is not significant, i.e. deposition of carbon cannot be prevented so there is no increase in the durability of the catalyst. On the other hand, when the amount of water exceeds 99 moles, the cracking reaction (1) involves substantially the same endotherm ($\Delta H$) as in an ordinary steam reforming reaction where $CH_3OH + H_2O \rightarrow 3H_2 + CO_2$ in which $\Delta H_{25° C.} = 11.8$ kcal/mole. This is disadvantageous in that the increasing calorific value of the produced gas is reduced as compared with the endotherm of the cracking reaction in which the cracking reaction proceeds as folows: $CH_3OH \rightarrow CO + 2H_2$ where $\Delta H_{25° C.} = 21.7$ kcal/mole. This is also disadvantageous in that a required amount of water or steam becomes high.

The water may be mixed with the methanol by either mixing of water and methanol in the form of liquid or mixing of methanol vapor with steam.

The reaction conditions in the process of the present invention include a pressure of from 0 to 50 kg/cm² and a reaction temperature of 150° to 600° C. Water should preferably be used in an amount of 1 to 99 moles or 1–5 moles per 100 moles of methanol. Most preferably, 1 to 20 moles of water per 100 moles of methanol is used.

As described above, any catalysts known to reform methanol may be used in the present invention. It is preferred to use catalysts which comprise at least one member selected from copper, zinc, metals of Group VIII of the Periodic Table and oxides thereof. Examples of the catalyst include:

(1) catalysts comprising a major proportion of copper oxide and chromium oxide and a minor proportion of oxides of manganese and barium (Japanese Patent Publication No. 54-11274);

(2) catalysts comprising a major proportion of copper oxide and zinc oxide and a minor proportion of chromium oxide (Japanese Laid-open Patent Application No. 57-174138) and further comprising aluminium oxide with or without manganese oxide and boron oxide (Japanese Laid-open Patent Application No. 59-131501);

(3) catalysts comprising zinc oxide and chromium oxide;

(4) catalysts comprising at least one oxide selected from the group consisting of copper, zinc and chromium oxides which supports or is mixed with nickel oxide (Japanese Laid-Open Patent Application Nos. 57-174138 and 57-174139);

(5) catalysts comprising copper oxide supported on a carrier such as alumina or silica (Japanese Laid-open Patent Application No. 58-17836 and "Surface" Vol. 20, No. 10, p. 555 (1982), by Yoko Takezawa);

(6) catalysts comprising nickel oxide, chromium oxide, copper oxide supported on alumina carrier (Japanese Patent Publication Nos. 58-46346 and 58-45286);

(7) catalysts comprising nickel and potassium on alumina (Japanese Laid-open Patent Application No. 57-144031); and (8) catalysts having platinum group metals supported on a suitable carrier, e.g. platinum or palladium on a carrier which is obtained by covering alumina with a basic oxide (Japanese Laid-open Patent Application No. 57-68140) and catalysts rhodium and potassium on alumina ("Surface", Vol. 9, No. 9, p. 513 (1981), by Koichi Mizuno).

These catalysts are mentioned as preferred, but are not intended to limit the number of catalysts thereto which can be employed in the practice of the invention.

The methanol reforming process of the invention proceeds more efficiently when the catalysts employed comprise nickel oxide or a mixture of nickel oxide and a basic oxide supported on a carrier containing copper and chromium oxides with or without manganese oxide and/or barium oxide.

The carrier should preferably contain not less than 10 wt% each of copper oxide and chromium oxide. Preferably, the carrier should further comprise not less than 0.1 wt% of manganese oxide and/or barium oxide. Most preferably, the carrier comprises 20 to 90 wt% of copper oxide, 10 to 80 wt% of chromium oxide, and 0.5 to 10 wt% of manganese oxide and/or barium oxide.

The nickel oxide supported on the carrier is preferably used in an amount not less than 0.1 wt%. The basic oxide should is preferably used in amounts not less than 0.01 wt%. Most preferably, the amount of nickel oxide is in the range of from 0.5 to 10 wt% and the amount of the basic oxide is in the range of 0.05 to 5 wt%.

The carrier consisting of copper and chromium oxides with or without manganese oxide and/or barium oxide may be prepared according to the following methods.

(1) A mixture of copper oxide or hydroxide and chromium oxide or hydroxide, both in the form of powder or paste, is mixed with a suitable amount of water, followed by mixing well, drying and sintering. If desired, manganese and/or barium oxide or hydroxide thereof may be added to the mixture.

(2) To an aqueous solution containing a copper compound such as copper nitrate and a chromium compound such as chromium nitrate is added an alkali such as an aqueous sodium carbonate solution. The mixture is mixed sufficiently to obtain a precipitate, followed by washing, drying and sintering. An aqueous solution of manganese and/or barium compound may be added to the above mixture.

(3) To an aqueous solution of a copper compound such as copper nitrate or copper sulfate is added an aqueous solution of a mixture of sodium chromate and liquid ammonia, which is then sufficiently mixed to give a precipitate, followed by washing, drying and sintering. At the time when the precipitate is prepared, a manganese compound such as manganese nitrate or manganese sulfate and/or a barium compound such as barium nitrate or barium chromate may be added.

The catalyst obtained according to methods (1) to (3) described above is in the form of a powder. However, if a binder is added, the catalyst may be molded to any desired form. In this case, the binder used may be graphite, polyvinyl alcohol, boric acid or diatomaceous earth.

The above methods are described only by way of explanation and should not be construed as limiting the present invention.

The nickel oxide and basic oxide may be supported on the thus obtained carrier by any known methods. For instance, if nickel oxide is supported, the carrier is immersed in an aqueous solution of a nickel compound such as nickel nitrate and then sintered to obtain a nickel oxide-on-carrier catalyst.

The basic oxide used herein is intended to mean an oxide of at least one element selected from the group consisting of alkali metal elements, alkaline earth metal elements, rare earth elements and elements of Group IIb. The basic oxide may be supported by immersing the carrier in an aqueous solution of a compound of the above element such as, for example, a nitrate, and sintering the immersed carrier.

When nickel oxide and a basic oxide are supported, the nickel oxide may be first supported, followed by deposition of the basic oxide. Alternatively, the basic oxide may be first deposited, followed by nickel oxide. Still alternatively, both nickel oxide and basic oxide may be supported simultaneously.

The present invention is more particularly illustrated by the following non-limiting examples.

EXAMPLE 1

Catalyst 1 was prepared according to the Adkins method in which an aqueous solution of a mixture of sodium bichromate and liquid ammonia was added to an aqueous solution of copper nitrate and agitated sufficiently to precipitate $Cu(NH_4)OHCr_2O_4$, followed by washing, drying and sintering at 350° C. to obtain catalyst 1 having a composition of $2CuO:Cr_2O_3$.

The above procedure was repeated except that manganese nitrate was added to obtain catalyst 2 having a molar ratio of $2CuO:Cr_2O_3:MnO_2 = 10:10:1$, or barium nitrate was added to obtain catalyst 3 having a molar ratio of 2CuO:Cr$_2$O$_3$:BaO=10:10:1, or that manganese sulfate and barium chromate were added to obtain catalyst 4 having a molar ratio of 2CuO:Cr$_2$O$_3$:MnO$_2$:BaO$_2$=10:10:0.5:0.5.

Thereafter, an aqueous solution of mixtures selected from the group consisting of copper nitrate, zinc nitrate, aluminium nitrate, chromium nitrate and manganese nitrate in selected ratios, and an aqueous solution of sodium carbonate were, respectively, heated to 80° C. and mixed under agitation to obtain precipitates, followed by washing, drying and sintering at 350° C., thereby obtaining catalysts 5–9 having the compositions indicated in Table 1. The procedure of preparing catalyst 9 was repeated except that zirconia powder was used instead of manganese nitrate, thereby obtain catalyst 10.

An alumina carrier was immersed in an aqueous solution of copper nitrate, dried and sintered at 700° C. to obtain catalyst 11 having 5 wt% of CuO based on the carrier (the content of catalytic component is based on the carrier herein and whenever it appears hereinafter). Moreover, a silica carrier was ion-exchanged with an aqueous solution of (tetramminecopper) nitrate and dried, followed by sintering at 350° C. to obtain catalyst 12 having 5 wt% of CuO. In addition, an alumina carrier was immersed in an aqueous solution of potassium nitrate and nickel nitrate in a predetermined ratio, dried and sintered at 500° C. to obtain catalyst 12 having NiO and K$_2$O in amounts of 0.5 wt%, respectively.

Catalysts 2 and 4 were provided as the carrier and immersed in an aqueous solution of nickel nitrate, dried and sintered at 500° C. to obtain catalysts 14 and 15 each having 2 wt% of NiO.

The catalysts 1 to 15 were each reduced in a stream of 2% H$_2$ at 200° C. for 10 hours (except that catalyst 13 alone was reduced under conditions of 400° C. and 3 hours), followed by an activity test in which methanol was reformed, as comparative example, under conditions of a pressure of 15 kg/cm$^2$.G, a liquid hourly space velocity of 1 hr$^{-1}$ and a reaction temperature of 270° C. The activity was evaluated after 10 hours and 2000 hours. The above activity test was repeated except that a mixture of methanol and water (having a molar ratio of H$_2$O and CH$_3$OH of 0.1) was used to evaluate the activity after 10 hours and 2000 hours.

The results are shown in Table 1 in which the molar ratio of H$_2$O and CH$_3$OH is abbreviated as S/C.

The compositions of the produced gases (except for H$_2$O) were found, for all the catalysts, to be as follows: when the molar ratio of H$_2$O and CH$_3$OH was zero, H$_2$=58–65%, CO=28–32%, CO$_2$=1–6% and others=2–12%; and when the molar ratio of H$_2$O and CH$_3$OH was 0.1, H$_2$=63–69%, CO=23–31%, CO$_2$=2–6% and others=2–5%.

EXAMPLE 2

An alumina carrier was immersed in an aqueous solution of magnesium nitrate, calcium nitrate, barium nitrate, potassium nitrate or lanthanum nitrate, dried and sintered at 550° C., thereby depositing 10 wt% of each of MgO, CaO, BaO, K$_2$O or La$_2$O$_3$ based on the alumina to obtain carriers 1 to 5. The thus obtained carriers 1 to 5 were each immersed in an aqueous solution of platinum nitrate, dried and sintered at 550° C. to obtain catalysts 16 to 20 each having 0.5 wt% of Pt thereon.

The carrier 2 was used and immersed in an aqueous solution of palladium or rhodium chloride, dried and sintered at 550° C. to obtain catalyst 21 having 0.5 wt% of palladium and catalyst 22 having 0.5 wt% of rhodium.

The above catalysts 16 to 22 were reduced in a stream of 4% hydrogen at 450° C. for 3 hours, followed by the activity test in the same manner as in Example 1 except that the reaction temperature was 340° C. The results are shown in Table 2.

TABLE 2

| | | Reactivity of Methanol (%) | | | |
|---|---|---|---|---|---|
| | | S/C = 0 (Comparison) | | S/C = 0.1 (Invention) | |
| Cat. No. | Catalyst Composition (molar ratio) | after 10 hrs. | after 2000 hrs. | after 10 hrs. | after 2000 hrs. |
| 16 | Pt/MgO/Al$_2$O$_3$ | 90 | 77 | 97 | 93 |
| 17 | Pt/CaO/Al$_2$O$_3$ | 91 | 79 | 99 | 95 |
| 18 | Pt/BaO/Al$_2$O$_3$ | 90 | 76 | 97 | 92 |
| 19 | Pt/K$_2$O/Al$_2$O$_3$ | 83 | 70 | 91 | 85 |
| 20 | Pt/La$_2$O$_3$/Al$_2$O$_3$ | 85 | 72 | 92 | 85 |
| 21 | Pd/CaO/Al$_2$O$_3$ | 86 | 71 | 94 | 88 |
| 22 | Rh/CaO/Al$_2$O$_3$ | 84 | 70 | 92 | 87 |

The compositions of the produced gases (except for H$_2$O) were found, for all the catalysts, to be as follows: when the molar ratio of H$_2$O and CH$_3$OH was zero, H$_2$=59–65%, CO=28–32%, CO$_2$=1–6% and others=2–10%; and when the molar ratio of H$_2$O and CH$_3$OH was 0.1, H$_2$=63–68%, CO=27–32%, CO$_2$=2–6% and others=2–5%.

TABLE 1

| | | Reactivity of Methanol (%) | | | |
|---|---|---|---|---|---|
| | | S/C = 0 (Comparison) | | S/C = 0.1 (Invention) | |
| Cat. No. | Catalyst Composition (molar ratio) | after 10 hrs. | after 2000 hrs. | after 10 hrs. | after 2000 hrs. |
| 1 | 2CuO:Cr$_2$O$_3$ = 10:10 | 80 | 67 | 85 | 78 |
| 2 | 2CuO:Cr$_2$O$_3$:MnO$_2$ = 10:10:1 | 82 | 71 | 88 | 83 |
| 3 | 2CuO:Cr$_2$O$_3$:BaO = 10:10:1 | 81 | 70 | 88 | 82 |
| 4 | 2CuO:Cr$_2$O$_3$:MnO$_2$:BaO = 10:10:0.5:0.5 | 82 | 72 | 88 | 83 |
| 5 | ZnO:Cr$_2$O$_3$ = 10:2.5 | 77 | 65 | 80 | 75 |
| 6 | CuO:ZnO = 10:10 | 79 | 66 | 84 | 75 |
| 7 | CuO:ZnO:Cr$_2$O$_3$ = 20:30:50 | 78 | 67 | 83 | 77 |
| 8 | CuO:ZnO:Al$_2$O$_3$ = 30:60:10 | 80 | 68 | 86 | 78 |
| 9 | CuO:ZnO:Al$_2$O$_3$:MnO$_2$ = 10:7.5:2.5:2.5 | 81 | 70 | 88 | 81 |
| 10 | CuO:ZnO:Al$_2$O$_3$:ZrO$_2$ = 10:7.5:2.5:2.5 | 83 | 71 | 90 | 84 |
| 11 | CuO/Al$_2$O$_3$ | 79 | 67 | 83 | 78 |
| 12 | CuO/SiO$_2$ | 81 | 70 | 85 | 79 |
| 13 | NiO, K$_2$O/Al$_2$O$_3$ | 75 | 63 | 80 | 75 |
| 14 | NiO/CuO.Cr$_2$O$_3$.MnO$_2$ | 88 | 79 | 95 | 91 |
| 15 | NiO/CuO.Cr$_2$O$_3$.MnO$_2$.BaO | 89 | 79 | 96 | 92 |

EXAMPLE 3

The catalysts 7 and 14 obtained in Example 1 were reduced in a stream of 2% hydrogen at 200° C. for 10 hours and used for reforming of methanol under conditions of a pressure of 25 kg/cm², a liquid hourly space velocity of 1 hr⁻¹ and a reaction temperature of 300° C. by the use of mixtures of methanol and water having different molar ratios to evaluate the activity after 10 hours and 4000 hours. The results are shown in Table 3.

TABLE 3

| | | Reactivity of Methanol (%) | | | | | |
|---|---|---|---|---|---|---|---|
| | | S/C = 0.05 | | S/C = 0.4 | | S/C = 0.9 | |
| Cat. No. | Catalyst Composition | after 10 hrs. | after 4000 hrs. | after 10 hrs. | after 4000 hrs. | after 10 hrs. | after 4000 hrs. |
| 7 | Cu—ZnO—$Cr_2O_3$ | 84 | 76 | 89 | 83 | 91 | 85 |
| 14 | NiO/CuO—$Cr_2O_3$—$MnO_2$ | 96 | 90 | 98 | 94 | 99 | 95 |

EXAMPLE 4

Carrier 11 having a composition of $CuO.CuCr_2O_4$ ($2CuO:Cr_2O_3$) was prepared according to the Adkins method.

The above procedure was repeated except that manganese nitrate was added to obtain carrier 12 ($CuO:Cr_2O_3:MnO_2$ by mole=10:10:1), that barium nitrate was added to obtain carrier 13 ($CuO:Cr_2O_3:BaO$ by mole=10:10:1), and that manganese nitrate and barium chromate were added to obtain carrier 14 ($CuO:Cr_2O_3:MnO_2:BaO$ by mole=10:10:0.5:0.5).

The thus obtained carriers 11 to 14 were each immersed in an aqueous solution of nickel nitrate, dried and sintered at 500° C. for 3 hours to obtain catalysts 31 to 34 each having 1.0 wt% of nickel oxide. Moreover, the carriers were each immersed in an aqueous solution of nickel nitrate and potassium nitrate, dried and sintered at 500° C. for 3 hours to obtain catalysts 35 to 38 each having 1.0 wt% if nickel oxide and 1.0 wt% of potassium oxide.

Further, the carriers 11 to 14 were each immersed in an aqueous solution of potassium nitrate, dried and sintered at 500° C. for 3 hours to obtain carriers 15 to 18 having 1.0 wt% of potassium oxide. The carriers 11 to 14 were also immersed in an aqueous solution of barium nitrate, dried and sintered at 500° C. for 3 hours to obtain carriers 19 to 22 each having 0.5 wt% of barium oxide.

The thus obtained carriers 15 to 22 were each immersed in an aqueous solution of nickel nitrate, dried and sintered at 500° C. for 3 hours to obtain catalysts 39 to 46 each having 2.0 wt% of nickel oxide thereon.

The catalysts are more fully described in Table 4.

TABLE 4

| Cat. No. | Catalytic Ingredient(s) | (wt %) | Carrier Composition |
|---|---|---|---|
| 31 | NiO | (1) | $CuO.Cr_2O_3$ |
| 32 | NiO | (1) | $CuO.Cr_2O_3.MnO_2$ |
| 33 | NiO | (1) | $CuO.Cr_2O_3.BaO$ |
| 34 | NiO | (1) | $CuO.Cr_2O_3.BaO.MnO_2$ |
| 35 | NiO | (1) | $CuO.Cr_2O_3$ |
|    | $K_2O$ | (1) | |
| 36 | NiO | (1) | $CuO.Cr_2O_3.MnO_2$ |
|    | $K_2O$ | (1) | |
| 37 | NiO | (1) | $CuO.Cr_2O_3.BaO$ |
|    | $K_2O$ | (1) | |
| 38 | NiO | (1) | $CuO.Cr_2O_3.BaO.MnO_2$ |
|    | $K_2O$ | (1) | |
| 39 | NiO | (1) | $K_2O$(1 wt %)/($CuO.Cr_2O_3$) |
| 40 | NiO | (1) | $K_2O$(1)/($CuO.Cr_2O_3.MnO_2$) |
| 41 | NiO | (1) | $K_2O$(1)/($CuO.Cr_2O_3.BaO$) |
| 42 | NiO | (1) | $K_2O$(1)/($CuO.Cr_2O_3.BaO.MnO_2$) |
| 43 | NiO | (1) | BaO(0.5 wt %)($CuO.Cr_2O_3$) |
| 44 | NiO | (1) | BaO(0.5)/($CuO.Cr_2O_3.MnO_2$) |
| 45 | NiO | (1) | BaO(0.5)/($CuO.Cr_2O_3.BaO$) |
| 46 | NiO | (1) | BaO(0.5)/($CuO.Cr_2O_3.BaO.MnO_2$) |

EXAMPLE 6

The catalyst 36 (NiO/$K_2O$/$CuO.Cr_2O_3.MnO_2$) obtained in Example 4 was reduced in the same manner as in Example 1 and then subjected to the activity test under reaction conditions indicated in Table 6. The results are summarized in Table 6 below.

TABLE 6

| Test No. | Starting Feed $H_2O$/$CH_3OH$ by mole | Reaction Pressure (kg/cm² · G) | Reaction Temperature (°C.) | LHSV (hr⁻¹) | Reaction Rate of Methanol (%) | Produced Gas Composition (mol %) | | | |
|---|---|---|---|---|---|---|---|---|---|
| | | | | | | $H_2$ | CO | $CO_2$ | Others |
| 8 | 0.1 | 0 | 300 | 1 | 98 | 68.5 | 27 | 4 | 0.5 |
| 9 | 0.1 | 10 | 300 | 1 | 93 | 68 | 27 | 4 | 1 |
| 10 | 0.1 | 15 | 300 | 1 | 87 | 67 | 25.5 | 6 | 1.5 |
| 11 | 0.1 | 26 | 300 | 1 | 75 | 67 | 24 | 7 | 2 |
| 12 | 0.7 | 0 | 300 | 1 | 98 | 73 | 7.99 | 19 | 0.01 |
| 13 | 0.7 | 10 | 300 | 1 | 97 | 73 | 6.98 | 20 | 0.02 |
| 14 | 0.7 | 15 | 300 | 1 | 95 | 74 | 2.97 | 23 | 0.03 |

Further, the continuous test of 2000 hours was effected under reaction conditions of the test Nos. 11 and 14 and no lowering of the activity was observed. The life of conventional catalysts is below 1000 hours, from which it will be seen that the life of catalyst of the invention is more than two times the life of conventional catalysts.

EXAMPLE 7

The carrier 12 obtained in Example 4 was immersed in each of aqueous solutions of sodium nitrate, calcium nitrate, magnesium nitrate, lanthanium nitrate, cerium nitrate and zinc nitrate, dried and sintered at 500° C. for 3 hours, thereby obtaining carriers 23 to 28 having 1.0 wt% of sodium oxide, calcium oxide, magnesium oxide, lanthanium oxide, cerium oxide and zinc oxide, respectively.

The thus obtained carriers 23 to 28 were each immersed in an aqueous solution of nickel nitrate, dried and sintered at 500° C. for 3 hours to obtain catalysts 47 to 52 each having 1.0 wt% of nickel oxide thereon.

Moreover, 100 parts by weight of the carrier 13 obtained in Example 4 was mixed with 5 parts by weight of boric acid and 2 parts by weight of graphite as binder. The mixture was shaped in the form of a cylinder having a diameter of 3 mm and a length of 3 mm. The cylinders were immersed in an aqueous solution of potassium nitrate, dried and sintered at 500° C. for 3 hours to obtain carrier 29 having 1.0 wt% of potassium oxide thereon. This carrier was further immersed in an aqueous solution of nickel nitrate thereby obtaining catalysts 53 to 57 containing 0.5, 1, 2, 5 and 10 wt% of nickel oxide.

Further, an aqueous solution of sodium carbonate was added to an aqueous solution of a mixture of copper and chromium nitrates to obtain a precipitate, which was then dried and sintered at 500° for 3 hours, thereby obtaining carrier 30 having a composition of CuO and $Cr_2O_3$ in a mixing ratio by weight of 80:20, carrier 31 having a composition of CuO and $Cr_2O_3$ in a mixing ratio by weight of 50:50, and carrier 32 having a composition of CuO and $Cr_2O_3$ in a mixing ratio by weight of 20:80.

These carriers 30 to 32 were each immersed in an aqueous solution of potassium nitrate, dried and sintered at 500° C. for 3 hours to obtain carriers 33 to 35 each having 1.0 wt% of potassium oxide.

The thus obtained carriers 33 to 35 were each immersed in an aqueous solution of nickel nitrate, dried and sintered at 500° C. for 3 hours to obtain catalysts 58 to 60 each having 2.0 wt% of nickel oxide.

The catalysts 47 to 60 were reduced in a stream of 2% hydrogen at 200° C. for 10 hours and then subjected to the activity test in which a mixture of methanol and water having a molar ratio of $H_2O$ and $CH_3OH$ of 0.1 was treated under conditions of a pressure of 15 kg/cm$_2$.G, a liquid hourly space velocity of 1 hr$^{-1}$ and a reaction temperature of 300° C. The results are shown in Table 7.

COMPARATIVE EXAMPLE

A $\gamma$-$Al_2O_3$ carrier having a particle size of 2 to 4 mm was immersed in an aqueous solution of nickel nitrate or chloroplatinic acid, dried and sintered at 500° C. for 3 hours to obtain catalyst 61 having 10 wt% of nickel oxide and catalyst 62 having 0.5 wt% of platinum for comparison.

The catalyst 61 was reduced in a stream of 2% hydrogen at 200° C. for 10 hours and the catalyst 62 was reduced in a stream of 2% hydrogen at 450° C. for 5 hours. An activity test for comparison was conducted using, as a starting material, 99.9% or over of methanol by the use of the respective catalysts under conditions of a normal temperature, a liquid hourly space velocity of 2 hr$^{-1}$ and a reaction temperature of 300° C.

TABLE 8

| Cat. No. | Catalytic Ingredient (wt %) | Reaction Rate of Methanol (%) | Produced Gas composition (mole %) | | | | Reaction Rate of Methanol After Continuous Test of 500 hrs. (%) |
|---|---|---|---|---|---|---|---|
| | | | $H_2$ | CO | $CO_2$ | Others | |
| 61 | NiO (10) | 81 | 56 | 26 | 3 | 15 | 43 |
| 62 | Pt (0.5) | 64 | 52 | 25 | 3 | 20 | 41 |

As will be seen from the results of Table 8, the reaction rate with methanol attained with the comparative catalyst is less than the rate achieved with the catalyst of the invention and is more liable to cause side reactions as will be seen from the produced gas composition.

The results of the foregoing examples and comparative example reveal that in the process for reforming methanol mixed with water according to the invention, the catalytic activity is maintained high over a long time of operation and thus the process is very effective.

What is claimed is:

1. A process for the production of a gaseous mixture containing hydrogen and carbon monoxide from methanol in accordance with the reaction:

$$CH_3OH + nH_2O \rightarrow (2+n)H_2 + (1-n)CO + nCO_2,$$

where $0 < n < 0.5$, which comprises contacting a mixture of methanol and water in a water:methanol ratio of 1:100 to 49:100 over a catalyst at a pressure of from 0 to 50 kg/cm$^2$ and a temperature of from 150° to 600° C., wherein said catalyst comprises, as a catalytic component, nickel oxide or a mixture of nickel oxide and a basic oxide supported on a carrier of copper oxide and chromium oxide, or a carrier of copper oxide and chromium oxide further comprising at least one member selected from the group consisting of manganese oxide and barium oxide, said basic oxide being selected from the group consisting of oxides of alkali metals, alkaline earth metals, rare earth metals and metals of Group IIb.

2. A process according to claim 1, wherein said carrier comprises 20 to 90 wt% of copper oxide and 80 to 10 wt% of chromium oxide.

3. A process according to claim 2, further comprising 0.5 to 10 wt% of manganese oxide and/or barium oxide.

TABLE 7

| Cat. No. | Amount of NiO (wt %) | Carrier Composition | Reaction Rate of Methanol (%) | Produced Gas Composition (mole %) | | | |
|---|---|---|---|---|---|---|---|
| | | | | $H_2$ | CO | $CO_2$ | Others |
| 47 | 1.0 | $Na_2O/(CuO.Cr_2O_3.MnO_2)$ | 87 | 67 | 26.5 | 4 | 1.5 |
| 48 | 1.0 | $CaO/(CuO.Cr_2O_3.MnO_2)$ | 86 | 67 | 27 | 4 | 2 |
| 49 | 1.0 | $MgO/(CuO.Cr_2O_3.MnO_2)$ | 86 | 67 | 26 | 5 | 2 |
| 50 | 1.0 | $La_2O_3/(CuO.Cr_2O_3.MnO_2)$ | 86 | 67 | 26.5 | 4 | 2.5 |
| 51 | 1.0 | $CeO_2/(CuO.Cr_2O_3.MnO_2)$ | 85 | 67 | 26.5 | 4 | 2.5 |
| 52 | 1.0 | $ZnO/(CuO.Cr_2O_3.MnO_2)$ | 84 | 67 | 27 | 4 | 2 |
| 53 | 0.5 | $K_2O(CuO.Cr_2O_3.MnO_2.binder)$ | 85 | 67 | 25 | 6.5 | 1.5 |
| 54 | 1.0 | $K_2O/(CuO.Cr_2O_3.MnO_2.binder)$ | 87 | 67 | 25.5 | 6 | 1.5 |
| 55 | 2.0 | $K_2O/(CuO.Cr_2O_3.MnO_2$ binder) | 89 | 67 | 26.5 | 5 | 1.5 |
| 56 | 5.0 | $K_2O/(CuO.Cr_2O_3.MnO_2.binder)$ | 91 | 67 | 27 | 4 | 2 |
| 57 | 10.0 | $K_2O/(CuO.Cr_2O_3.MnO_2.binder)$ | 89 | 67 | 28 | 3 | 2 |
| 58 | 2.0 | $CuO.Cr_2O_3$ [80:20] | 83 | 65 | 30 | 3 | 2 |
| 59 | 2.0 | $CuO.Cr_2O_3$ [50:50] | 82 | 66 | 29 | 3 | 2 |
| 60 | 2.0 | $CuO.Cr_2O_3$ [20:80] | 78 | 63 | 30 | 4 | 3 |

4. A process according to claim 1, wherein said catalytic component is nickel oxide in an amount not less than 0.1% based on the weight of the carrier.

5. A process according to claim 4, wherein the amount of nickel oxide is in the range of from 0.5 to 10 wt%.

6. A process according to claim 2, wherein said catalytic component is a mixture of nickel oxide used in an amount not less than 0.01% and a basic oxide used in an amount not less than 0.01%, both based on the weight of the carrier.

7. A process according to claim 6, wherein the amount of nickel oxide is in the range of from 0.5 to 10 wt% and the amount of basic oxide is in the range of from 0.05 to 5 wt%.

* * * * *